United States Patent
Darcy

(10) Patent No.: US 9,038,194 B2
(45) Date of Patent: May 19, 2015

(54) CLIENT-SIDE ENCRYPTION IN A DISTRIBUTED ENVIRONMENT

(75) Inventor: Jeffrey J. Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 245 days.

(21) Appl. No.: 13/307,238

(22) Filed: Nov. 30, 2011

(65) Prior Publication Data

US 2013/0138955 A1    May 30, 2013

(51) Int. Cl.
   *G06F 7/04*       (2006.01)
   *G06F 17/30*      (2006.01)
   *H04N 7/16*       (2011.01)
   *G06F 21/62*      (2013.01)
   *G06F 21/60*      (2013.01)

(52) U.S. Cl.
   CPC ........ *G06F 21/6218* (2013.01); *G06F 21/6281* (2013.01); *G06F 21/604* (2013.01)

(58) Field of Classification Search
   CPC . G06F 21/6218; G06F 21/604; G06F 21/628; G06F 21/60411
   USPC .............................. 713/193, 182; 726/2–3, 27
   See application file for complete search history.

(56) References Cited

U.S. PATENT DOCUMENTS

| | | | |
|---|---|---|---|
| 6,389,420 B1 * | 5/2002 | Vahalia et al. | 1/1 |
| 6,405,315 B1 * | 6/2002 | Burns et al. | 713/190 |
| 6,715,050 B2 * | 3/2004 | Williams et al. | 711/164 |
| 7,752,455 B2 * | 7/2010 | Maheshwari et al. | 713/189 |
| 8,024,605 B2 * | 9/2011 | Saravanakumar | 714/13 |
| 8,300,812 B2 * | 10/2012 | Van De Ven | 380/37 |
| 8,689,279 B2 * | 4/2014 | Basmov et al. | 726/1 |
| 2002/0184214 A1 * | 12/2002 | Lucovsky et al. | 707/7 |
| 2002/0184398 A1 * | 12/2002 | Orenshteyn | 709/310 |
| 2003/0053475 A1 * | 3/2003 | Veeraraghavan et al. | 370/431 |
| 2003/0079100 A1 * | 4/2003 | Williams et al. | 711/165 |
| 2005/0160481 A1 * | 7/2005 | Todd et al. | 726/30 |
| 2010/0095115 A1 * | 4/2010 | Murray | 713/165 |
| 2012/0110338 A1 * | 5/2012 | Druschel et al. | 713/182 |

* cited by examiner

*Primary Examiner* — Eleni Shiferaw
*Assistant Examiner* — Jing Sims
(74) *Attorney, Agent, or Firm* — Lowenstein Sandler LLP

(57) ABSTRACT

Methods and systems for encrypting and decrypting data are described. In one embodiment, a client computing system sends to a server computing system over a network a first network request to perform multiple operations such as a lease operation and a fetch operation. In response, the server computing system performs the operations. Subsequently, the client computing system can send subsequent network requests to write re-encrypted data and to relinquish the lease. The subsequent network requests may also be single network requests that perform lease operations, as well as other operations, such as operations for block alignment purposes. The client computing system can send an actual end of file when relinquishing the lease so that the server computing system can handle a remainder of data that is used for subsequently decrypting the re-encrypted data.

20 Claims, 11 Drawing Sheets

CIPHER FEEDBACK (CFB) MODE ENCRYPTION

CLIENT-SIDE ENCRYPTION IN A DISTRIBUTED ENVIRONMENT

TECHNICAL FIELD

Embodiments of the present invention relate to data storage systems, and more specifically to distributed data storage systems.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher. As such, the term "encipher" and "encrypt" may be used interchangeably in the following discussion. Likewise, the term "decipher" and "decrypt" may also be used interchangeably in the following discussion.

Encryption is used to protect military and civilian systems, examples of which include Internet e-commerce, mobile telephone networks, bank automatic teller machines, etc. As technology and computing power advance, new vulnerabilities are commonly discovered for encryption mechanisms that were previously considered secure.

Conventionally, ciphertext block chaining provides an encryption mode to prevent an attacker from being able to create a code table from commonly repeated blocks. For instance, a block of space characters typically results in the same ciphertext block. Specifically, an output stream is prepended with a random block, which is referred to as an initialization vector (IV). For a block to be enciphered, the IV is combined with the current block of plaintext using a binary exclusive or (XOR) operation. Then the resulting block is enciphered. The current IV is replaced with the resulting enciphered block, which is appended to the output stream.

Block-based encryption typically involves an actual amount of data to be encrypted into data sizes that are exact multiples of the cipher-block size. For example, the operating system of a computing system may encrypt data in blocks and each block has a block size, such as 512 bytes. However, the size of an encrypted file should match the size when decrypted. When a file is encrypted, the encryption may add additional data bytes to a particular block, which may change the size of the file. This may have some undesirable effects.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
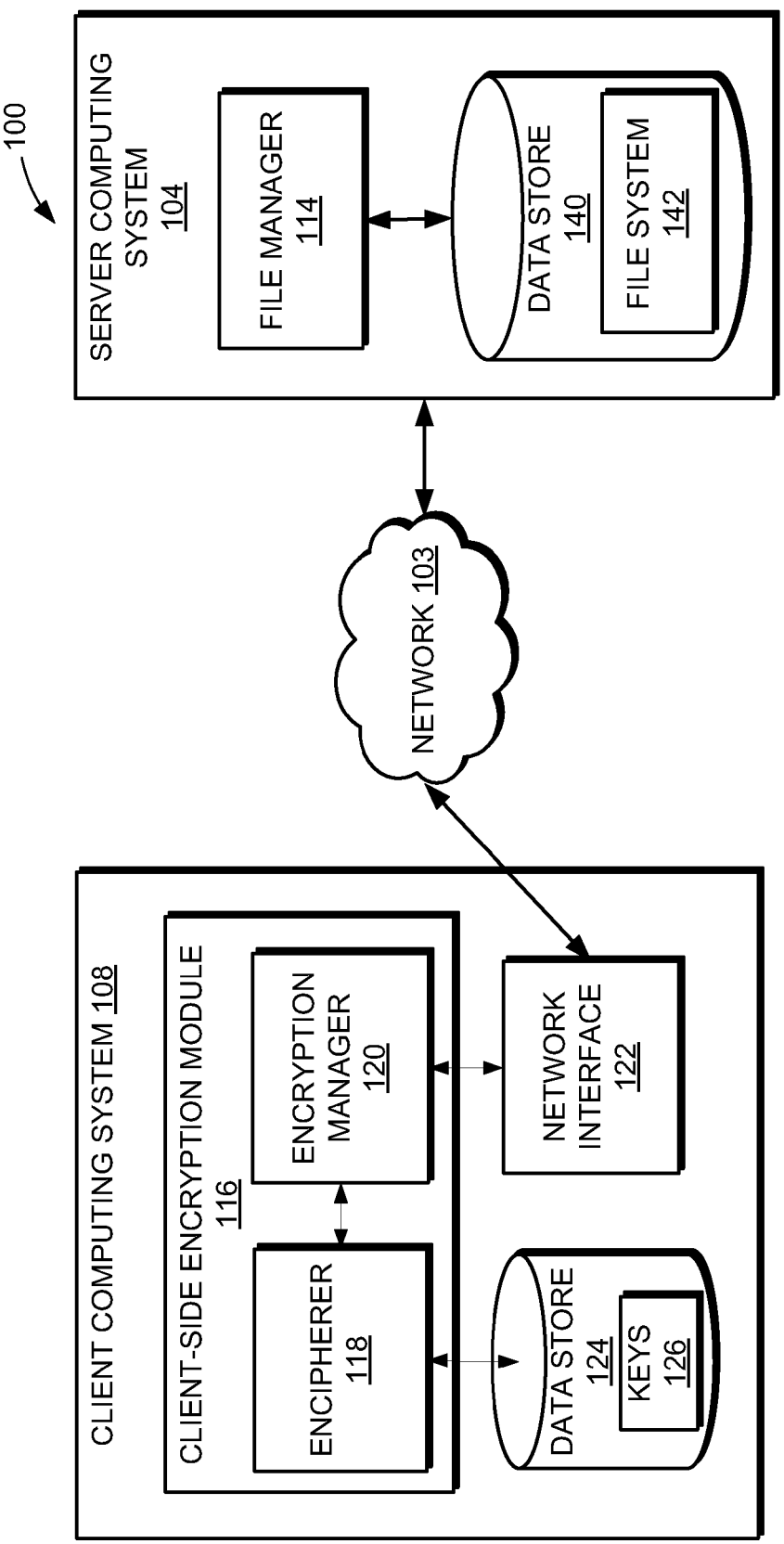
FIG. 1 is a block diagram of an exemplary network architecture in which embodiments of a proxy object may operate.

Methods and systems for encrypting and decrypting data are described. In one embodiment, a client computing system sends to a server computing system over a network a first network request to perform multiple operations such as a lease operation and a fetch operation. In response, the server computing system performs the operations. Subsequently, the client computing system can send subsequent network requests to write re-encrypted data and to relinquish the lease. The subsequent network requests may also be single network requests that perform both lease operations, as well as other operations, such as operations for block alignment purposes. The client computing system can send an end of file message when relinquishing the lease so that the server computing system can handle a remainder of data that is used for subsequently decrypting the re-encrypted data.

In one embodiment, a client computing system sends to a server computing system over a network a first network request to perform a first operation to obtain a lease of a data range of encrypted data stored in a data store associated with the server computing system and to perform a second operation to fetch contents of the data range of encrypted data. The first network request is a single network operation for the server computing system to perform atomically both the first operation and the second operation. The client computing system receives the contents of the data range of encrypted data in response. The client computing system subsequently sends to the server computing system a second network request to perform a third operation to write re-encrypted data in the data store. The client computing system also sends a third network request to perform a fourth operation to relinquish the lease of the data range. As part of the third network request, the client computing system can send a fifth operation to indicate an actual end of file when the data range includes the end of the file.

In another embodiment, a server computing system performs a first operation to obtain a lease of a data range of encrypted data stored in a data store associated with the server computing system in response to receiving a first network request. In response to the first network request, the server computing system also performs a second operation to fetch contents of the data range of the encrypted data and send to the client computing system over the network the contents. The server computing system performs the first and second operations atomically in response to a network operation associated with the first network request. The server computing system performs a third operation to write re-encrypted data in the data store in response to receiving a second network request. The server computing system performs a fourth operation to relinquish the lease of the data range in response to a third network request. The third network request may include a fifth operation to indicate an actual end of file when the data range includes the end of the file. The server computing system can use the end of file to handle the remainder that is used for subsequent decrypting of the re-encrypted data.

The embodiments described herein may be used to address security issues, concurrency issues, as well as end of file issues in client-side encryption in a distributed environment. For encryption of data in a distributed environment, a client computing system (also referred to herein as client) encrypts the data and stores the data in a remote store, such as a remote data store managed by a server computing system (also referred to herein as server). The encryption may be done using keys that are only available to the client computing system. Unlike encryption of data stored locally that uses operations that are relatively cheap in computational resource, client-side encryption in a distributed environment use requests over a network that may be relatively more expensive in computational resources than those used in encryption of data stored locally. Also, for client-side encryption in distributed environments, there are chances of conflicts when multiple client computing systems try to modify the same region of a file simultaneously. As described herein, when part of a cipher block (also referred to as a block of ciphertext) is to be modified, the client computing system reads the portion of the cipherblock that is not being written, combines this portion with the portion that is being written to a new block, encrypts the new block, and sends the encrypted block to a server computing system to be written to disk. This is a read-modify-write sequence. There is a possibility of collision if another user at the same time may be trying to do a similar read-modify-write sequence for the same part or a different part of the same cipher block. The embodiments described herein provide an improved client-side encryption method and apparatus to address the possibility of collision of data by multiple clients in a distributed system.

Another issue for client-side encrypting in distributed environments, is when writing at the end of a file. One of the properties of block-based encryption is that when an encipherer encrypts data, the encipherer generates an entire cipher block regardless of whether the entire cipher block should be used or not. As described above, block-based encryption involves encrypting an actual amount of data into data sizes that are multiples of the cipher-block size (e.g., 512 bytes). When encrypting the end of the file, there may be extra data generated with encryption that should be stored for proper decryption later, but that is not part of the file. This portion of the cipherblock may be referred to as a remainder. However, the size of an encrypted file should match the size of data when decrypted. It is not likely that all files will exactly correspond to a multiple of the cipher-block size. The embodiments described herein provide an improved client-side encryption method and apparatus to ensure cipherblock alignment.

As described herein, block-based encryption involves re-writing partial cipher-blocks using a read-modify-write sequence to include the unwritten bytes in the encryption. These operations, however, should be atomic in a distributed environment, even when the write operations to the same cipher-block are initiated from separate clients. The embodiments described herein may perform unaligned write operations. For example, the actual sequence for doing an unaligned write operation is as follows:
    message exchange 1: acquire lease for blocks being written
    message exchange 2: write blocks
    message exchange 3: relinquish lease
The lease precludes simultaneous access to the same block range while the lease is held. The lease may be set to automatically expire after a fixed time. The embodiments described herein combine operations used to deal with cipherblock alignment with the lease operations. That is, a single network operation can be issued by a client computing system that causes the server computing system to perform a lease operation and a second operation concerning block alignment as described herein. It is said that the second operation piggy-backs, or bootstraps, the lease operation. For example, the sequence for performing an aligned write operation would be as follows:
    message exchange 1: acquire lease for blocks being written and acquire the "missing pieces" of the first and last cipherblocks
    message exchange 2: write all but the last cipherblock
    message exchange 3: write the last cipherblock (with correct file size) and relinquish lease
The "missing pieces" are the remainders of the first and/or last blocks if either is being partically written. The server computing system can write the "live" part of the last cipherblock to the file but store the "extra" part, if any, elsewhere, such as in an extended attribute, to avoid perturbing the stored file size. In another example, the sequence for performing an aligned write could be as follows:
    message exchange 1: acquire lease for a cipher block and fetch the contents of that cipher block in one network operation
    message exchange 2: write the entire cipher block (may include a remainder)
    message exchange 3: relinquish the lease of the cipher block and tell server where the real end of file should be (remaining portion is the remainder)
By telling the server where the real end of file should be (how much of the last cipher block is actually real data), the server can deal with the remainder, such as storing the remainder in an extended attribute. The server can store the remainder somewhere else instead of being part of the file contents. The server can store the extra information with the contents of the file but indicate that so many bytes of data at the end of the file are not part of the file.

The embodiments described herein allow block-based encryption in a distributed environment that allows partial cipher-blocks to be written using a read-modify, write sequence in atomic way, even when the writes to the same cipher-blocks are initiated from separate clients. The embodiments described herein also allow for cipherblock alignment in the block-based encryption in a distributed environment by way of combining cipherblock alignment operations with the lease operations. The embodiments may piggy-back or bootstrap other block alignment operations with the lease operations by using a single network operation that has the block alignment type functionality. In other words, the operations are not separate transactions sent and received over the network. For example, the single network operation may provide the information for handling the lease, such as a byte range within the file that is being modified. In response, the client may receive an identifier (ID) that identifies the lease as well as the current data for the corresponding cipher block. Subsequently, the client can use the ID to identify the lease to be relinquished after writing the modified data to the file. For another example, the single network operation may provide the ID information to relinquish the lease as well as the end of file information to allow the server to know the true end of file and can handle the remainder.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "performing," "enciphering," "encrypting," "deciphering," "decrypting," "generating," "communicating," "capturing," "executing," "defining," "specifying," "creating," "processing," "providing," "computing," "calculating," "determining," "displaying," "detecting," "sending," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of a client-side encryption module 116 may operate. The network architecture 100 may include a server computing system 104 and a client computing system 108, each connected via a network 103, which may be a private network (e.g., a local area network (LAN), wide area network (WAN), intranet, etc.) or a public network (e.g., the Internet). The client computing system 108 may be one or more machines, including a desktop computer, laptop computer, server, cellular phone, personal digital assistant (PDA), etc. In one embodiment, the client computing system 108 is a server of an enterprise, but is a "client" with respect to the server computing system 104. The client computing system 108 interacts with the server computing system 104 by exchanging messages via standard protocols, e.g., FTP and HTTP.

In the depicted embodiment, the client computing system 108 executes an client-side encryption module 116. The client-side encryption module 116 is configured to perform client-side encryption (including encrypting and decrypting) data stored remotely in the file system 142 in a distributed environment. The client-side encryption module 116 includes an encipherer 118 and an encryption manager 120. The client-side encryption module 116 communicates with a file manager 114 of the server computing system 104 over the network 103 using a network interface 122. The operations of the client-side encryption module 116 is described in connection with FIGS. 2-6B below.

In one embodiment, keys 126 are stored in a data store 124, which can be one or more centralized data repositories that store the file system 142, such as data used to execute the file manager 114, user data, configuration data, or the like. The data store 124 may be secondary memory or main memory. The main memory may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory may include one or more persistent data storage devices that may include, for example static memory, hard drives, optical drives, tape backup systems, etc. The secondary memory may be local to the client computing system 108 (as illustrated), or external to the client computing system 108. The keys 126 may be stored, for example, in a protected region of main memory or secondary memory (memory accessible to certain processes). In yet another embodiment, keys 126 are stored externally to client computing system 108. Such externally stored keys 126 may be stored, for example, in a universal serial bus (USB) dongle, firewire dongle, or other external storage device. In embodiments that implement external keys, encrypted regions of the main memory and secondary memory may not be decrypted unless the external storage device having keys 126 is communicatively coupled to computing system 100.

Figure 2:
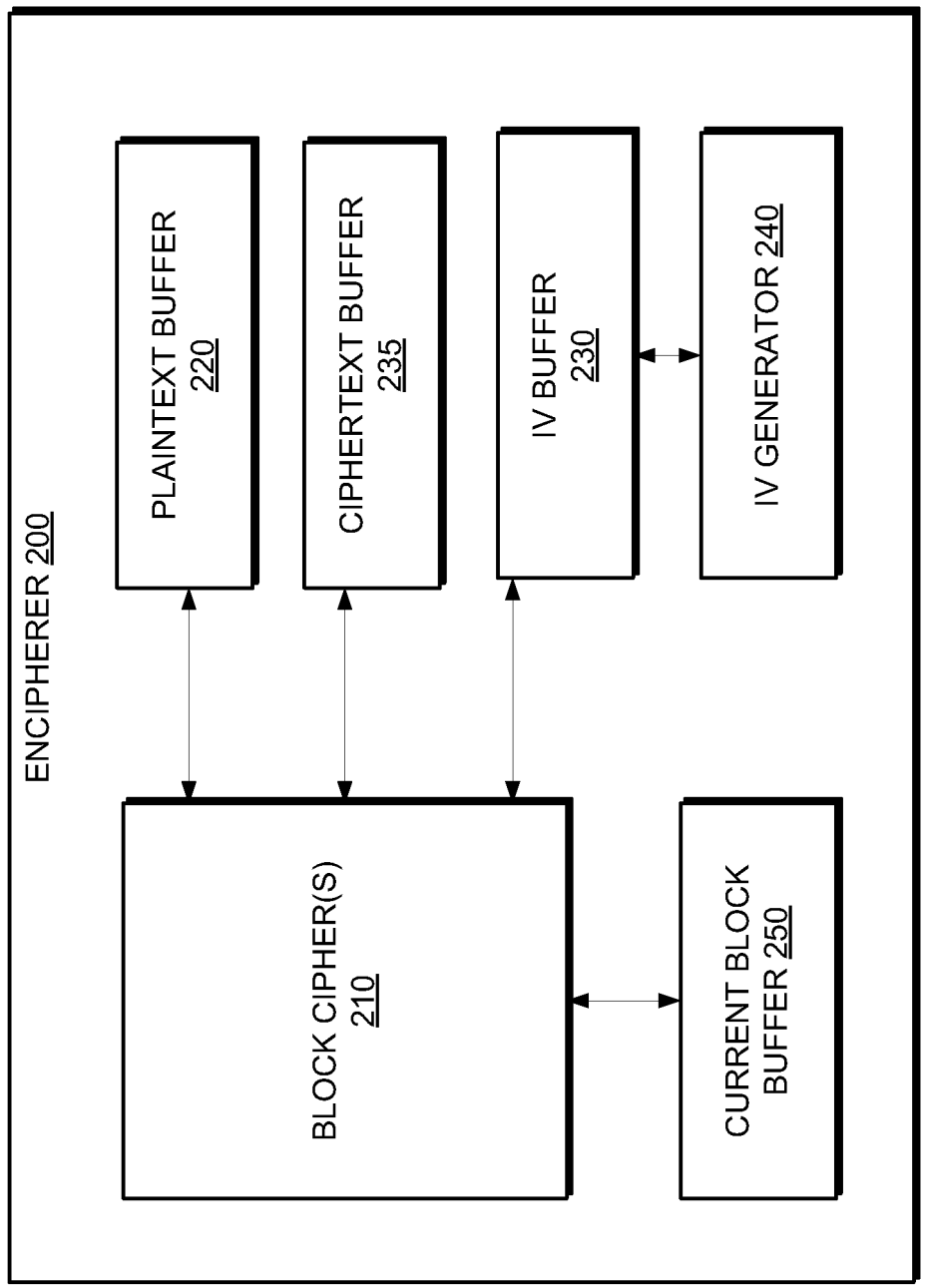
FIG. 2 is a block diagram of the encipherer of FIG. 1 according to one embodiment.

The keys 126 may include one or more block cipher keys for use with block cipher(s) of encipherer 118 (e.g., 200 of FIG. 2). In one embodiment, keys 126 may also include the initialization value to use in current block buffer of encipherer 118 when encryption or decryption is started. In an alternative embodiment, the initialization value used is fixed. In one embodiment, keys 126 determine which one or more of the block cipher(s) are used by encipherer 118. In an alternative embodiment, this selection is fixed. In one embodiment, keys 126 are encrypted such that a password should be provided to enable access to them. Alternatively, keys 126 may not be encrypted. In another embodiment, the initialization values may be salts stored in the file storing the blocks to be encrypted or decrypted. In one embodiment, each file can have a unique salt.

In one embodiment, encipherer 118 is a hardware component of computing system 100. Alternatively, encipherer 118 may include software that is part of an operating system, an application, or a combination thereof. Encipherer 118 may also be a combination of two or more of software, firmware, and hardware.

In some embodiments, encipherer 118 can encipher data to be stored in the file system 142 in a distributed environment. in the main memory and the secondary memory to secure such data. When enciphering data, new keys may be generated and stored, or existing keys may be provided. The encrypted data may not be read or used until encipherer 118 deciphers the enciphered data using the same keys 126 used to encrypt the data.

The server computing system 104 may be one or more machines including one or more server computers, gateways, or other computing systems. In the depicted embodiment, the server computing system 104 executes a file manager 114. In one embodiment, the file manager 114 is a software a process run on the server computing system 104 to perform one or more functions. In another embodiment, the file manager 114 is a file manager computer that manages the file system 142. The file manager 114 may be software, hardware, firmware, or any combination thereof.

The file manager 114 manages the files in the file system, as well as the leases of the data in the file system 142. The file manager 114 can manage lease information and metadata for the files in the file system 142. In one embodiment, the lease information and metadata for the files are stored in a cached disk array and may maintain a cache memory of recently accessed files metadata or lease information. Alternatively, the lease information and/or the metadata may be stored in non-volatile memory. The file manager 114 receives requests from one or more clients to access the data in the file system 142. The file manager 114 ensure concurrency of the data using leases as described herein. Additional details of the file manager 114 have not been included since such the operations and configurations of different types of file managers 114 would be understood by one of ordinary skill in the art.

The server computing system 104 may also include a local data store 140, which can be one or more centralized data repositories that store the file system 142, such as data used to execute the file manager 114, user data, configuration data, or the like. The local data store 140 may represent a single or multiple data structures (databases, repositories, files, etc.) residing on one or more mass storage devices, such as magnetic or optical storage based disks, tapes or hard drives. Although illustrated as being local to the server computing system 104, the local data store 140 may be remote from the server computing system 104 and the server computing system 104 can communicate with the remote data store over a public or private network, a bus, or the like.

FIG. 2 is a block diagram of the encipherer 200 of FIG. 1 according to one embodiment. The encipherer 200 may correspond to the encipherer 118 of FIG. 1. The encipherer 200 enciphers (or encrypts) and deciphers (or decrypts) data. In one embodiment, the encipherer 200 includes one or more block ciphers 210, which are coupled to one or more input buffers and one or more output buffers. When encrypting, the input buffers are identified as the plaintext buffer 220 and IV buffer 230, and the output buffer is identified as the ciphertext buffer 135. The IV buffer 230 may be coupled with an IV (initialization vector) generator 240. When decrypting, the input buffers are identified as the ciphertext buffer 235 and the IV buffer 230, and the output buffer is identified as the plaintext buffer 220. The encipherer 200 may also include a current block buffer 250 coupled to the block ciphers 210.

Block ciphers 210 are substitution ciphers that operate on fixed-length groups of bits known as blocks. Where data to be encrypted is longer than a block, the data may be divided into multiple blocks, and each block is separately encrypted. In one embodiment, block ciphers may execute an encryption and a decryption algorithm, each of which accepts an input block of size n bits as a first input and a key of size k bits as a second input, and produce an n-bit output block. For example, a block cipher might take as an input a 128-bit block of plaintext (which is unenciphered data) and an 80 bit key, and output a corresponding 128-bit block of ciphertext (which is ciphered data). Likewise, the block cipher may take as an input a 128-bit block of ciphertext and the 80 bit key, and output a 128-bit block of plaintext. In another embodiment, the encryption algorithm may accept an input block of size m bits, and output a block of size n bits, and the decryption algorithm may accept an input block of size n bits, and output a block of size m bits. Some exemplary block sizes for a block cipher to operate on include 64 bit (i.e., 8 byte) and 128 bit (i.e., 16 byte), and some exemplary common key sizes include 40 bits, 56 bits, 64 bits, 80 bits, 128 bits, 160 bits, 168 bits, 192 bits, 256 bits, and 512 bits. Other sized blocks and keys may also be used. Some examples of block ciphers include twofish, blowfish, serpent, data encryption standard (DES), advanced encryption standard (AES), CAST5, international data encryption algorithm (IDEA), etc.

Plaintext buffer 220 may be a storage device or part of a storage device that contains unencrypted data. The data may be either awaiting encryption, or the result of decryption. Likewise, ciphertext buffer 235 may be a storage device or part of a storage device that contains encrypted data. The data may be either awaiting decryption, or the result of encryption.

In some embodiments, IV generator 240 generates random or unpredictable sequences of bits that are of the same size as the input block size of the block ciphers 210. The encipherer 200 may direct IV generator 240 to generate one or several of these bit sequences at a time, and store the resulting sequences in ciphertext buffer 235. In one embodiment, the IV generator 240 generates a current IV and inputs the current IV into the block cipher 210.

Current block buffer 250 may be a storage device or part of a storage device large enough to contain a bit sequence that is the same size as the input block size or the output block size of the block ciphers 210. Block ciphers 210 may retrieved data to be enciphered from current block buffer 250 when encrypting. Alternatively, block ciphers 210 may store the deciphered data into current block buffer 250 when decrypting.

In some embodiments, data is encrypted by encipherer 200 in sequential blocks. Encipherer 200 may start encryption by directing IV generator 240 to provide one or more blocks of data to use as initialization vectors, and storing them into ciphertext buffer 235. The current block buffer may be initialized with a particular value. The contents of current block buffer 250 may be enciphered using one or more of block ciphers 210, and the resulting ciphertext may be appended to the current contents of ciphertext buffer 235.

In some embodiments, data is decrypted by encipherer 200 in sequential blocks. The blocks of ciphertext may be stored in the current block buffer 250 before being decrypted into a block of plaintext. The contents of current block buffer 250 may be deciphered using one or more of block ciphers 210, and the resulting plaintext may be appended to the current contents of plaintext buffer 220. Encipherer 200 may start decryption by initializing current block buffer 250 identically to how it was initialized while encrypting. The encipherer 200 can store the block of plaintext in the plaintext buffer 220.

A simple form of encryption modes is the electronic codebook (ECB) mode. The file or data object is divided into blocks and each block is encrypted separately. However, this mode has a disadvantage of identical plaintext blocks being encrypted into identical ciphertext blocks, failing to hide patterns. In ECB, because a codebook is created, you can look at the plaintext and the ciphertext and determine what is going on logically. So, parts of the encrypted stream could become visible to an attacker if the attacker knows that this code is encoded with this plain text and can come up with this cipher text with this key. In an attempt to get around this problem, a certain value, known as an initialization vector (IV) can be used. The IV is XORed with your plain text and the result is encrypted. The encrypted vale can then be used as the IV for the next block in the file so that IV changes for every block in the file. Therefore, even though an attacker may know two places where there are the same plaintext in the block that uses the same key, the plaintext does not produce the same cipher text. So that's called cipher-block chaining (CBC). That is called cipher-block chaining (CBC).

Figure 3A:
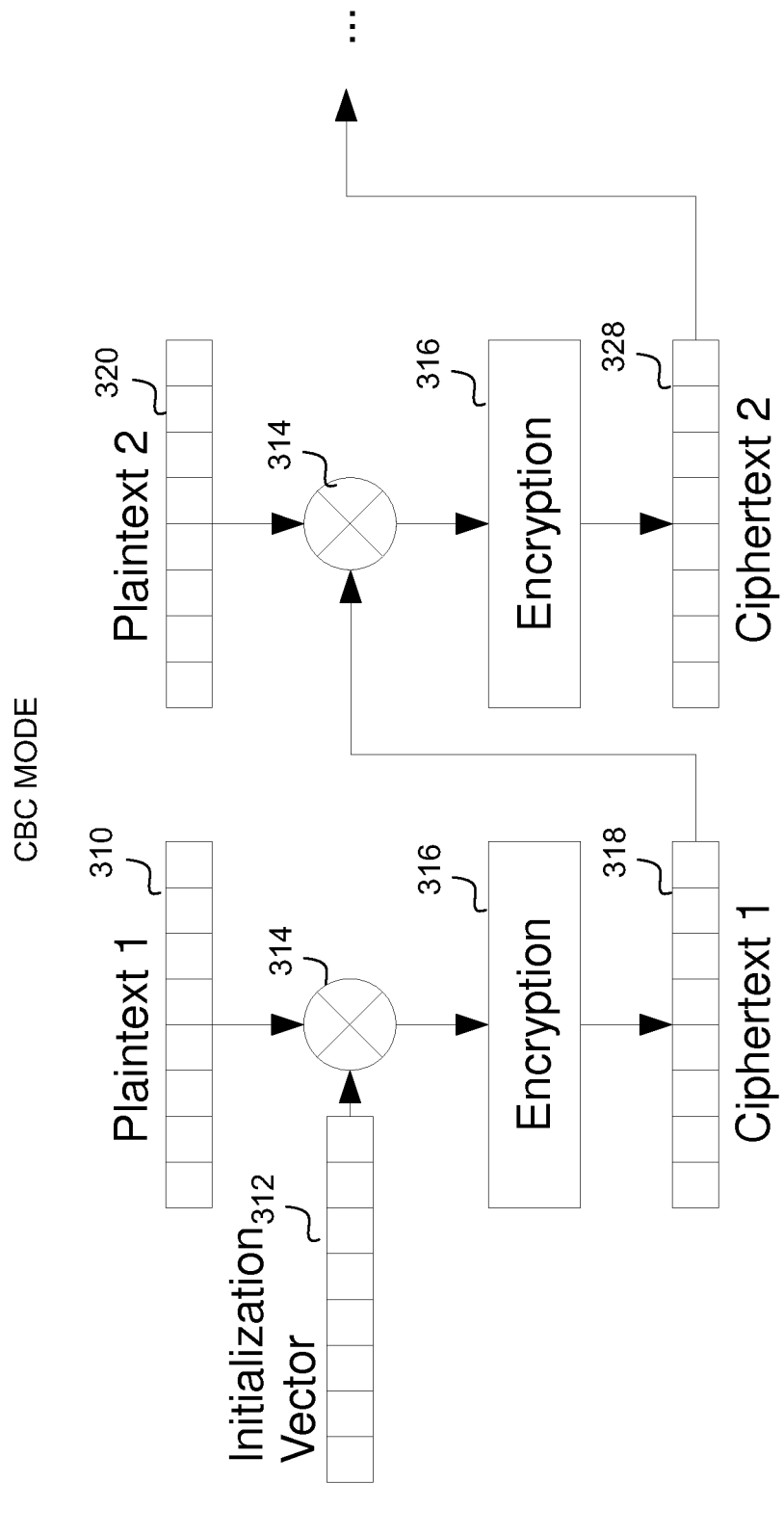
FIG. 3A illustrates a cipher-block chaining (CBC) mode encryption.

FIG. 3A illustrate a cipher-block chaining (CBC) mode encryption. In CBC mode encryption, each block of plaintext is XORed with the previous ciphertext block before being encrypted. This way, each ciphertext block is dependent on all plaintext blocks processed up to that point. Also, to make a file or data object unique, an initialization vector (IV) is used in the first block. CBC has been a commonly used mode of operation. Its main drawbacks are that encryption is sequential (i.e., it cannot be parallelized), and that the file or data object should be padded to a multiple of the cipher block size. Note that a one-bit change in a plaintext or IV affects all following ciphertext blocks. Decrypting with the incorrect IV causes the first block of plaintext to be corrupt but subsequent plaintext blocks will be correct. This is because a plaintext block can be recovered from two adjacent blocks of ciphertext. As a consequence, decryption can be parallelized. Note that a one-bit change to the ciphertext may cause corruption of the corresponding block of plaintext, and invert the corresponding bit in the following block of plaintext, but the rest of the blocks remain intact.

In FIG. 3A for CBC mode, plaintext block 310 is concatenated 314 with an initialization vector (IV) 312. The result of the concatenation 314 is encrypted 316 into ciphertext block 318. The ciphertext block 318 is used as the IV for the next plaintext block 320. In particular, the plaintext block 320 is concatenated with the ciphertext block 318, and the result of the concatenation 314 is encrypted 316 into ciphertext block 328. This process can be repeated for all plaintext blocks of the file.

Figure 3B:
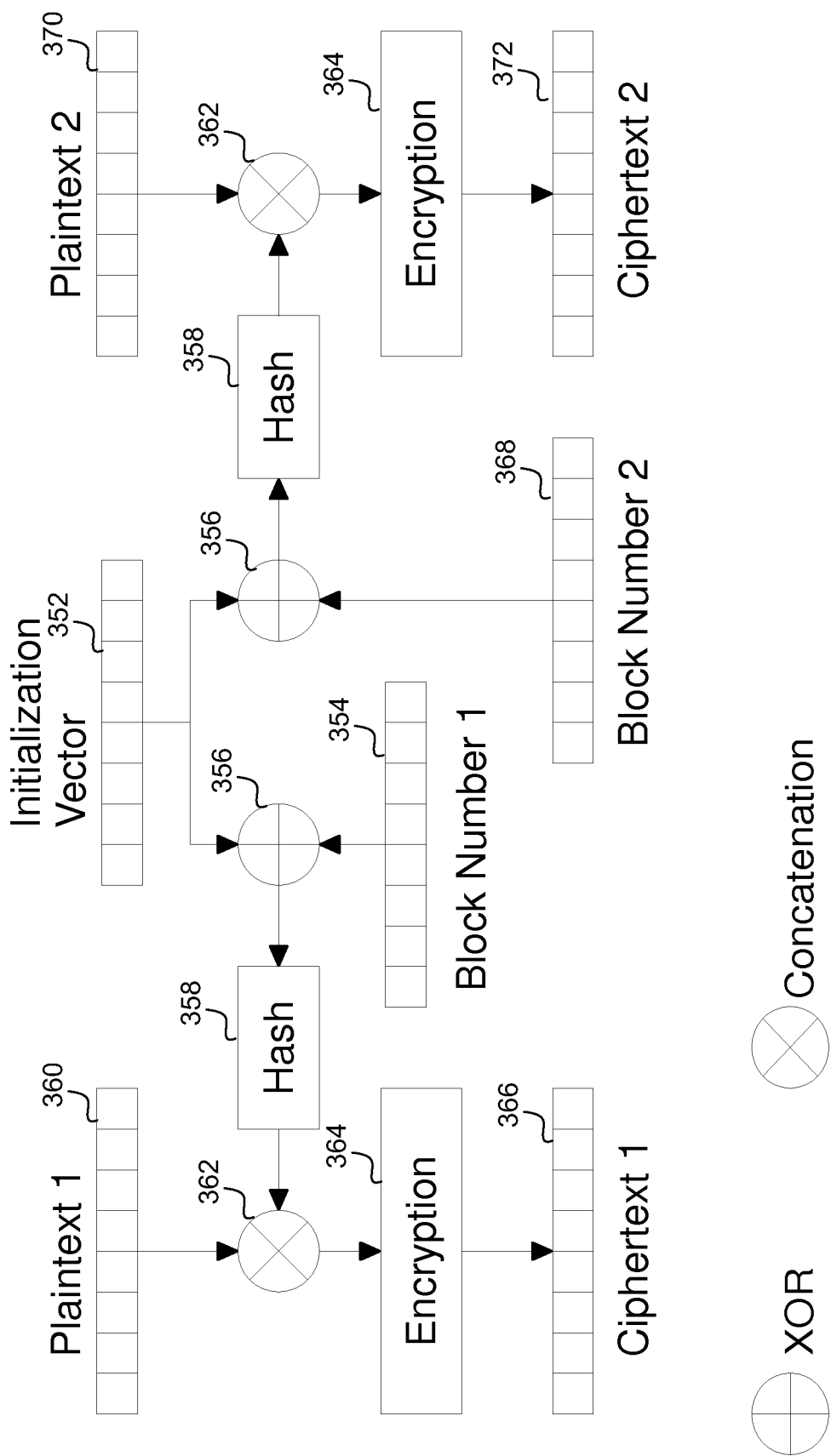
FIG. 3B illustrates a hashed-based cipher-block mode encryption.

FIG. 3B illustrates a hashed-based cipher-block mode encryption. In this embodiment, an initialization vector (IV) 352 is XORed 356 with a block number 354 corresponding to a first plaintext block 360. The result of the XOR 356 is hashed to create a hash 358 of the IV 352 and the block number 354. The plaintext block 360 is concatenated with the hash 358, and the result is encrypted 364 to create a first ciphertext block 366. For an adjacent block, such as another block of the same file, the initialization vector 352 is also XORed 356 with a block number 368 corresponding to a second plaintext block 370. The result of the XOR 356 is hashed to create a hash 358 of the IV 352 and the block number 368. The plaintext block 370 is concatenated with the hash 358, and the result is encrypted 365 to create a second ciphertext block 372. This may be repeated for all the blocks of the file with the same IV 352. The IV 352 may be stored in the file or in connection with the file. The IV 352 may be encrypted, and thus decrypted before being XORed with the block numbers. The IV 352 may be a salt. In other embodiments, the file may use more than one IV for the blocks of data of a file as would be appreciated by one of ordinary skill in the art having the benefit of this disclosure. In one embodiment, each file in the file system can store a unique IV or different IVs to further protect the data from unauthorized inspection or unauthorized modification of the data. It should be noted that the IV 352 can be concatenated with the block number 354 or the block number 368. It should also be noted that the hashing function can be used so that a small change on the input of the hashing function dramatically changes the output. That way, even if the IV 352 is public or becomes public, this would not comprises the filesystem. In particular, even if the block numbers are not very different, the hash generated with those block numbers, which are used as inputs into the plaintext concatenation, will be very different from block to block.

Figure 3C:
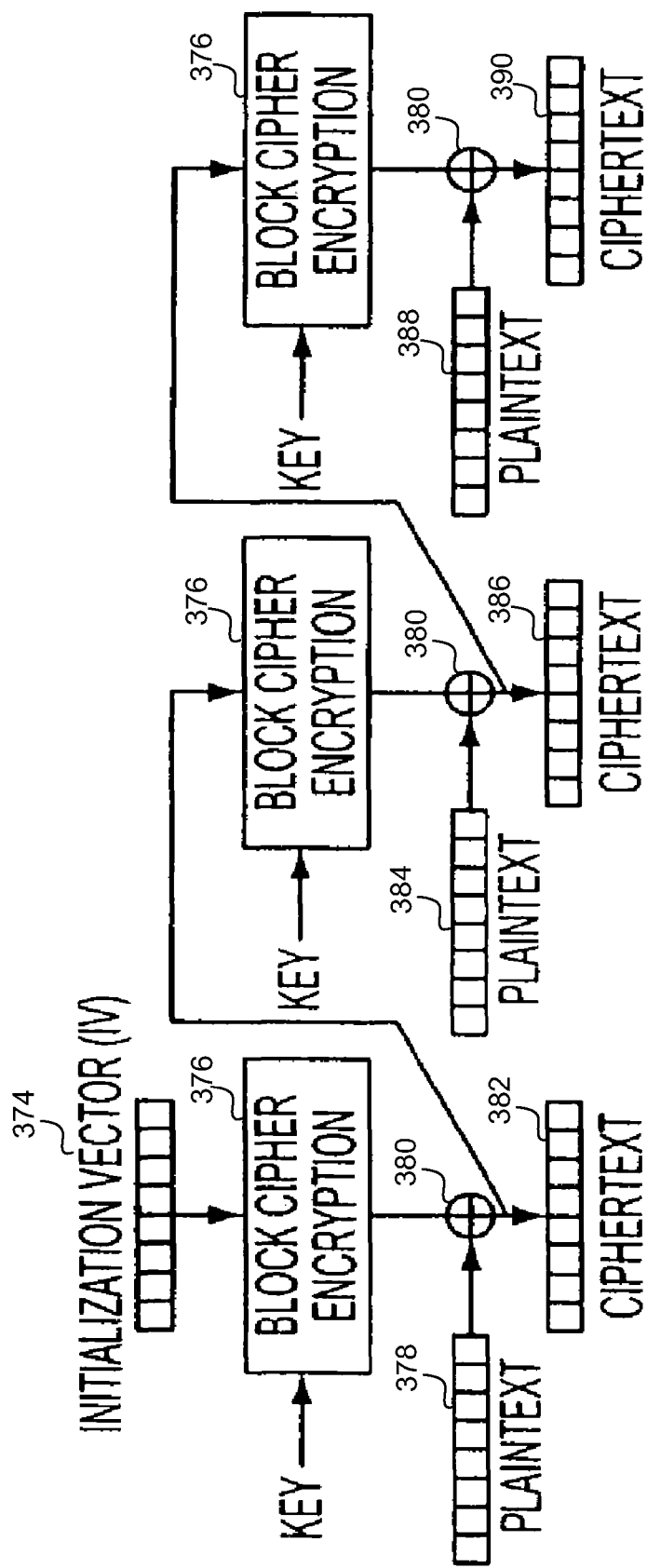
FIG. 3C illustrates a cipher feedback (CFB) mode encryption.

FIG. 3C illustrates a cipher feedback (CFB) mode encryption. In this embodiment, an initialization vector (IV) 374 is encrypted 376 to create a temporary block. The temporary block and a first plaintext block 278 are XORed 380 to create a first ciphertext block 382. The first ciphertext block 382 is encrypted 376 to generate a second temporary block, which is XORed 380 with a second plaintext block 384 to create a second ciphertext block 386. The second ciphertext block 386 is encrypted 376 to generate a third temporary block, which is XORed 380 with a third plaintext block 388 to create a third ciphertext block 390. This may be repeated for all the blocks of the file with the same IV 374. In other embodiments, the file may use more than one IV for the blocks of data of a file as would be appreciated by one of ordinary skill in the art having the benefit of this disclosure.

In other embodiments, other mode encryption may be used as would be appreciated by one of ordinary skill in the art having the benefit of this disclosure.

Figure 4:
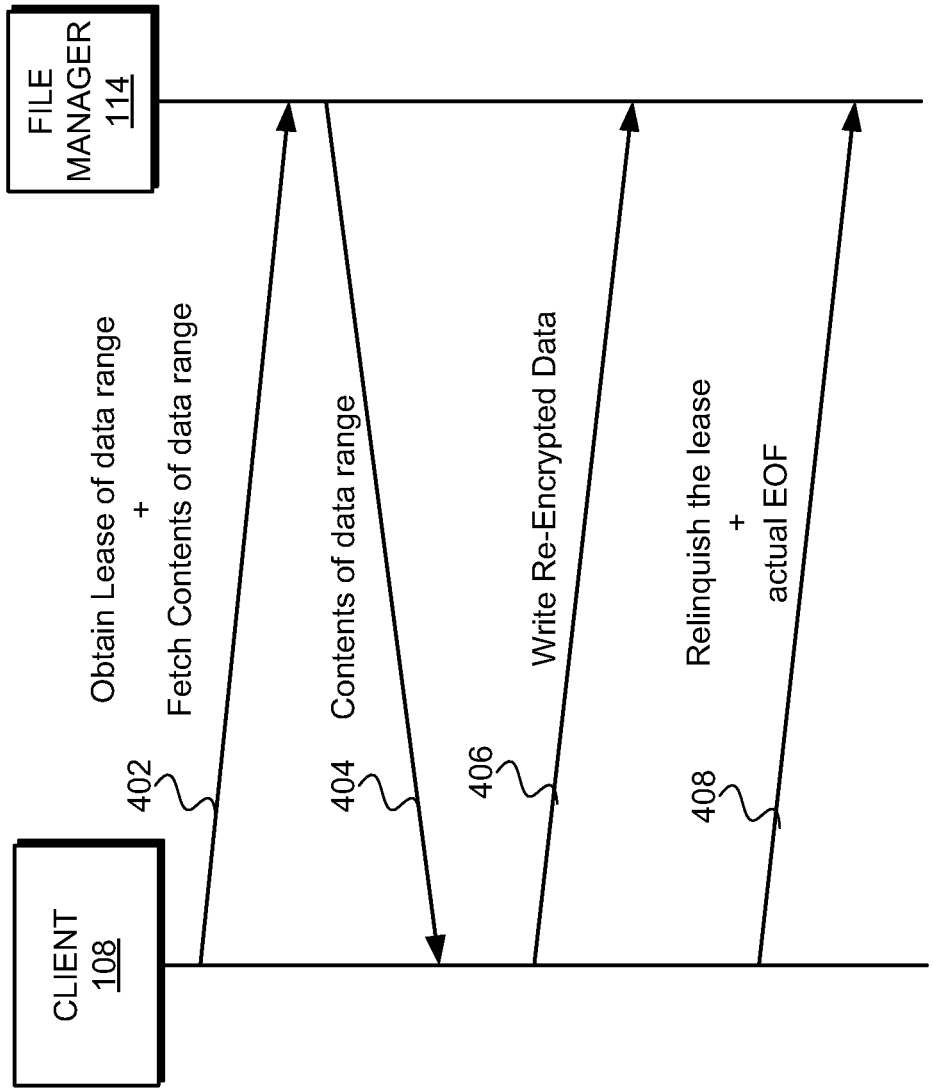
FIG. 4 is a diagram illustrating lease operations combined with block alignment operations in single network operations according to one embodiment.

FIG. 4 is a diagram illustrating lease operations combined with block alignment operations in single network operations according to one embodiment. In this embodiment, the client 108 initiates a first network operation 402 by sending a first network request that includes an lease operation to obtain a lease of a data range of encrypted data stored in a remote store managed by a file manager 114. The first network request also includes a fetch operation to obtain the contents of the data range of encrypted data of the data range. The fetch operation is used for alignment purposes and consolidates the two operations into a single network operation. In response, the file manager 114 obtains the lease, fetches the data, and sends a reply 404 with the contents of the data range. The client 108 may perform various operations on the encrypted data. For example, the client 108 can decrypt the encrypted data and modify all or portions of the data. After the client 108 modifies the encrypted data, the client 108 re-encrypts the data and initiates a second network operation 406 that sends a write operation to the file manager 114 to write the re-encrypted data. The client 108 may identify the re-encrypted data as being the modified encrypted data corresponding the data range under lease. Alternatively, the client 108 may identify the lease in the write operation so that the file manager 114 can handle the write operation. There are times when the re-encrypted data is larger or smaller in size than the original encrypted data. In these situations, the file manager 114 should know where the end of the file is and how to handle any remainder. Thus, in addition to the second network operation, the client 108 initiates a third network operation 408 that sends a relinquish lease operation, as well as an indication of the actual end of file. The file manager 114 uses the actual EOF in the third network operation 408 to determine where the actual EOF is and how to store the remainder for subsequent decrypting. In some embodiments, the file manager 114 stores the remainder in an extended attribute of the file. In another embodiment, the remainder is stored in another location in the file system in such a way that it is retrieved when the other encrypted data is being used so that the encrypted data can be properly decrypted. The client 108 uses the single network operations to bootstrap different operations for block alignment along with the lease operations. Alternatively, the client 108 can uses this technique to bootstrap other types of operations on the lease operations instead of block alignment operations or in addition to the block alignment operations.

Figure 5A:
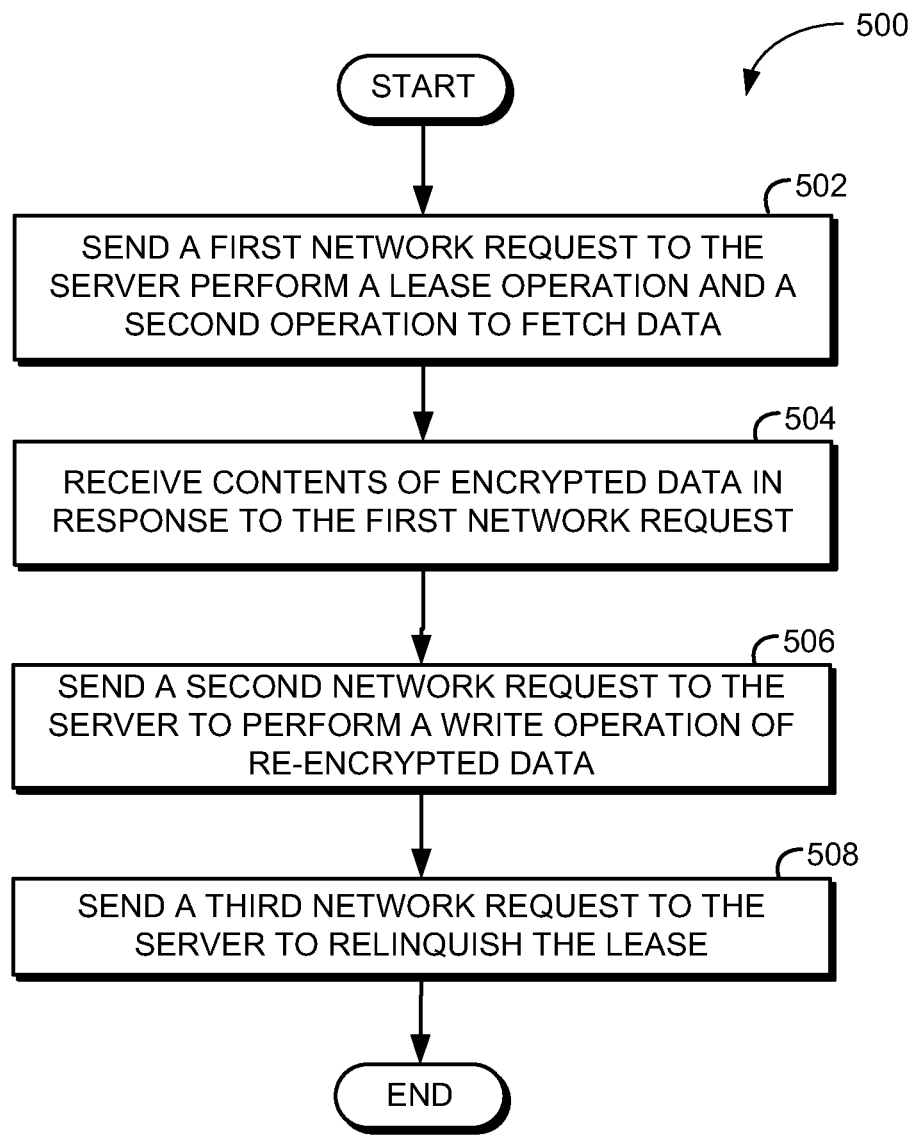
FIG. 5A is a flow diagram of one embodiment of a method of client-side operations for writing re-encrypted data in a distributed environment.

FIG. 5A is a flow diagram of one embodiment of a method 500 of client-side operations for writing re-encrypted data in a distributed environment. The method 500 is performed by processing logic that may comprise hardware (circuitry, dedicated logic, etc.), software (such as is run on a general purpose computing system or a dedicated machine), firmware (embedded software), or any combination thereof. In one embodiment, the client-side encryption module 116 of FIG. 1 performs the method 500. Alternatively, other components of the client computing system 108 can perform some or all of the operations of method 500.

Referring to FIG. 5A, processing logic begins with sending a first network request to a server to perform a lease operation to obtain a lease of a data range of encrypted data stored in a distributed environment and a second operation to fetch contents of the data range (block 502). The lease operation and the second operation are combined into a single network operation in which the server atomically performs the two operations. It can be said that the fetch operation is bootstrapped or piggy-backed onto the lease operation. The first network request is a single network operation for the server to perform atomically both the lease operation and the fetch operation that is used for block alignment. Next, the processing logic receives the contents of the data range of encrypted data from the server in response to the first network request (block 504). The processing logic can perform various operations on the encrypted data, such as decrypting the data, modifying the data, and the like. Once the data is to be written, the processing logic re-encrypts the data, and sends a second network request to the server to perform a write operation of the re-encrypted data (block 506). The processing logic also sends a third network request to the server to relinquish the lease (block 508), and the method 500 ends.

In one embodiment at block 508, the processing logic also sends end of file information with the third network request to relinquish the lease. The end of file information can be used by the server to handle a remainder in the re-encrypted data. For example, the server can store the remainder in another location associated with the file, such as an extended attribute. The server should store the remainder to allow correct decryption of the re-encrypted data. In one embodiment, the processing logic determines whether the data range of the encrypted data includes an end of file. In the third network request, the processing logic sends a block alignment operation to indicate an actual end of file when the data range includes the end of file. This block alignment operation is said to be bootstrapped or piggy-backed on the relinquish lease operation. The third network request is a single network operation for the server to perform atomically both the relinquish lease operation and the block alignment operation.

In another embodiment, the processing logic performs the following before block 506: decrypt the contents of the data range of encrypted data to obtain decrypted data, modify the decrypted data, and re-encrypt the modified data into the re-encrypted data. In order to re-encrypt the data, the processing logic should use the entire block even if just portions of the block are modified. In one embodiment, the encrypted data is one or more blocks of ciphertext, the decrypted data is one or more blocks of plaintext, and the re-encrypted data is one or more blocks of ciphertext. The encrypted and re-encrypted data can be encrypted using block-based encryption, such as the mode encrustations described above with respect to FIGS. 3A-3C. Alternatively, other block-based encryption modes may be used as would be appreciated by one of ordinary skill in the art having the benefit of this disclosure.

In one embodiment at block 504, the processing logic receives a current block of ciphertext. The ciphertext block may include a first portion of ciphertext that is to be modified and a second portion that may not be modified. The processing logic decrypts the entire current block of hypertext into plaintext, modifies a first portion of the plaintext corresponding to the first portion of ciphertext, and merges the modified first portion and a second portion of plaintext corresponding to the second portion of ciphertext not modified. The processing logic encrypts the first and second portions into a new block of ciphertext. The processing logic at block 506 sends the new block of ciphertext to the server to be written.

In another embodiment at block 504, the processing logic receives multiple blocks of ciphertext, in which one or more of the ciphertext blocks are to be modified. The processing logic decrypts the blocks of ciphertext of those to be modified into multiple blocks of plaintext. The processing logic modifies the plaintext accordingly, and encrypts the modified one or more blocks of plaintext into new blocks of ciphertext. In one embodiment, the processing logic at block 506 sends the new blocks of ciphertext to the server to be written. In another embodiment, the processing logic at block 506 sends all but a last one of the new blocks of ciphertext, and at block 506 sends a write operation in the third network request to write the last one of the new blocks of ciphertext and to indicate an actual end of file within the last one of the new blocks of ciphertext. In this embodiment, the third network request is a single network operation for the server computing system to perform atomically both the write operation and the block alignment operation.

In one embodiment, the data range corresponds to encrypted data of the entire file. In another embodiment, the data range corresponds to encrypted data of a portion of the entire file. It should also be noted that the processing logic can request a data range of the encrypted data to be modified, and the server can determine which blocks contain the data range if more than one block, and can send all the data of those blocks, even if the blocks reside outside of the data range requested. This way all of the data used for re-encryption is made available to the client-side encryption.

Figure 5B:
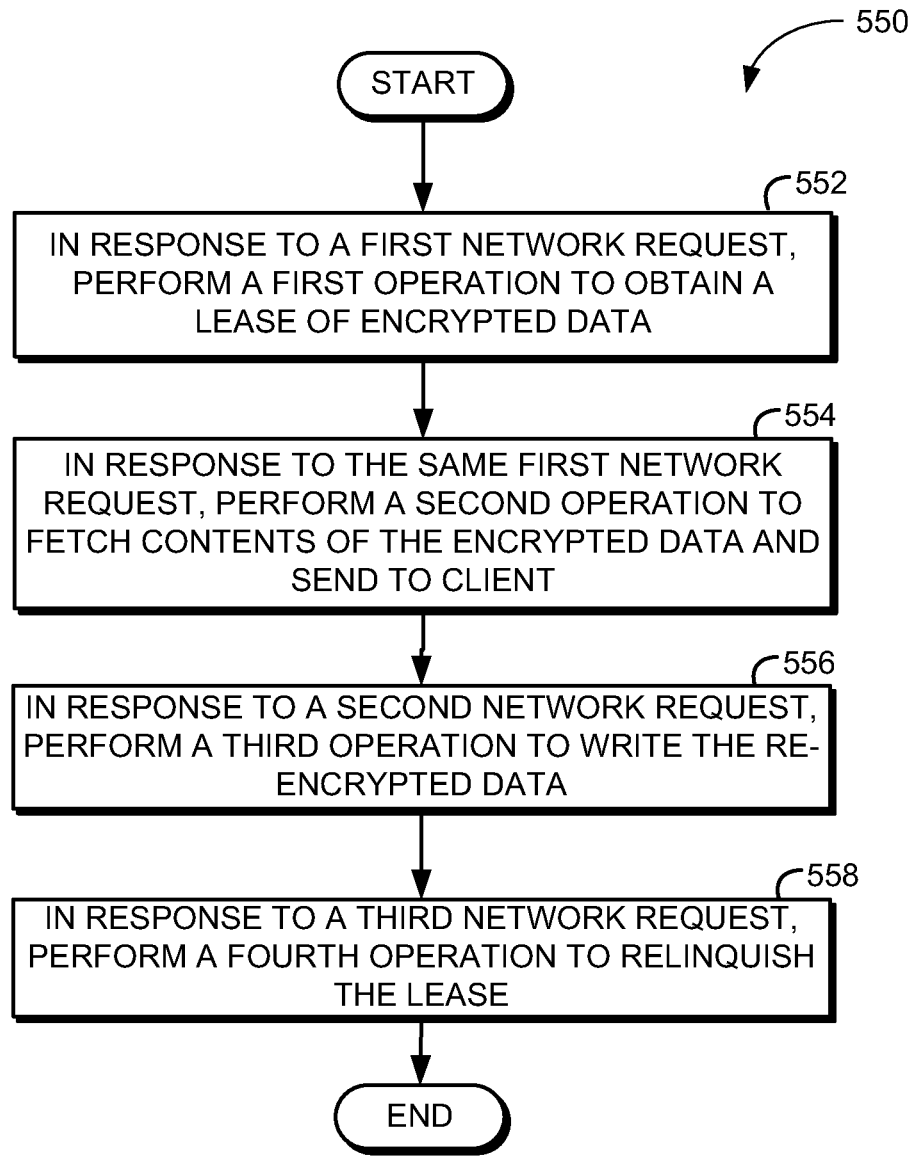
FIG. 5B is a flow diagram of one embodiment of a method of server-side operations for writing re-encrypted data in a distributed environment.

FIG. 5B is a flow diagram of one embodiment of a method 550 of server-side operations for writing re-encrypted data in a distributed environment. The method 550 is performed by processing logic that may comprise hardware (circuitry, dedicated logic, etc.), software (such as is run on a general purpose computing system or a dedicated machine), firmware (embedded software), or any combination thereof. In one embodiment, the file manager 114 of FIG. 1 performs the method 550. Alternatively, other components of the server computing system 104 can perform some or all of the operations of method 550.

Referring to FIG. 5B, processing logic begins with performing a first operation to obtain a lease of encrypted data in response to a first network request (block 452). Also, in response to the same first network request, the processing logic performs a second operation to fetch contents of the data range of encrypted data and sends the contents to the client (block 454). The first network request is a single network operation and the first and second operations are performed atomically by the processing logic in response to the first network request. In response to a second network request, the processing logic performs a third operation to write re-encrypted data received from the client (block 556). In response to a third network request, the processing logic performs a fourth operation to relinquish the lease (block 558), and the method 550 ends.

In one embodiment at block 558, the processing logic also performs a fifth operation to indicate an actual end of file in response to receiving the third network request. The third network request indicates that the data range includes an end of file. The fifth operation is considered a block alignment operation. The processing logic can handle this information in various ways. In one embodiment, the processing logic stores a remainder, as identified as the data after the actual end of file, in a storage location, such as an extended attribute associated with the file so that the remainder can be sent to the client when requested. The remainder is used to correctly decrypt the re-encrypted data.

In one embodiment at block 556, the processing logic receives a new block of ciphertext to be written as the re-encrypted data in connection with the second network request. In another embodiment at block 556, the processing logic receives multiple new blocks of ciphertext to be written as the re-encrypted data in connection with the second network request. In another embodiment at block 556, the processing logic receives all but a last one of a new set of blocks of ciphertext to be written as a first portion of the re-encrypted data. Then at block 558, in connection with the third network request, the processing logic receives the last block of ciphertext to be written, and indicates an actual end of file within the last block. This write can be piggy-backed or bootstrapped to the relinquish lease operation of the third network request. This allows the server to atomically perform both operations in response to a single network operation by the client.

As described above, the data range may correspond to encrypted data of the entire file. Alternatively, the data range may correspond to encrypted data of a portion of the entire file. It should also be noted that the processing logic can receive requests for a data range of the encrypted data to be modified, and the processing logic can determine which blocks contain the data range if more than one block, and can send all the data of those blocks, even if the blocks reside outside of the data range requested. This way all of the data used for re-encryption is made available to the client-side encryption.

Figure 6A:
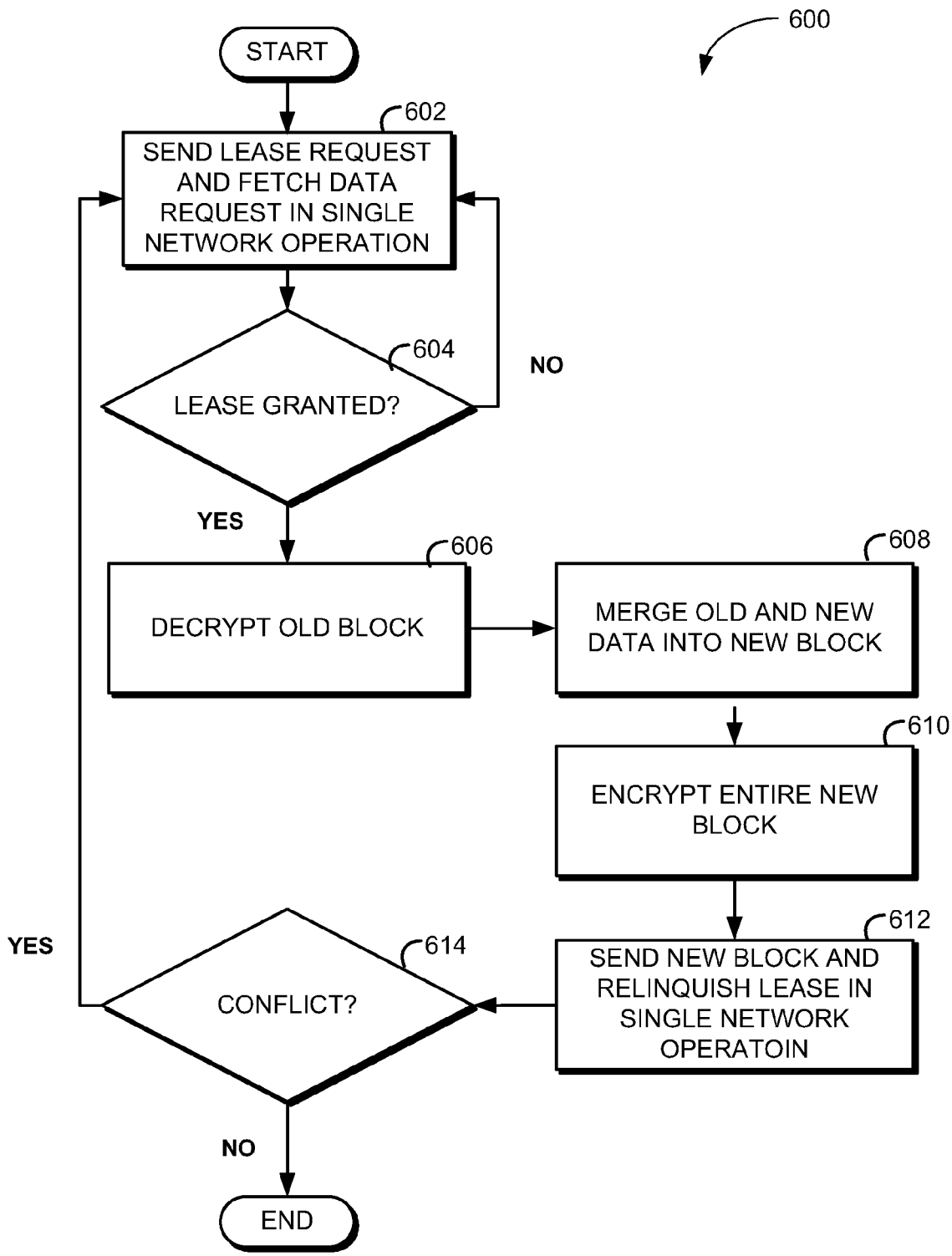
FIG. 6A is a flow diagram of another embodiment of a method of client-side operations for a read-modify-write sequence in a distributed environment.

FIG. 6A is a flow diagram of another embodiment of a method of client-side operations for a read-modify-write sequence in a distributed environment. The method 600 is performed by processing logic that may comprise hardware (circuitry, dedicated logic, etc.), software (such as is run on a general purpose computing system or a dedicated machine), firmware (embedded software), or any combination thereof. In one embodiment, the client-side encryption module 116 of FIG. 1 performs the method 600. Alternatively, other components of the client computing system 108 can perform some or all of the operations of method 600.

Referring to FIG. 6A, processing logic begins with sending a lease request and fetch data request in a single network operation to a server computing system that manages a remote data store (block 602). The processing logic determines if the lease is granted (block 604). If the lease is not granted, the processing logic returns to block 602 and the processing logic can reissue the lease request a second time. The lease may not be granted if the data being request is already subject to a lease. Alternatively, the lease may not be granted for other reasons as would be appreciated by one of ordinary skill in the art having the benefit of this disclosure. If the lease is granted at block 604, the processing logic receives the encrypted data (referred to as old block) and decrypts the old block (block 606). The processing logic modifies the data in response to one or more operations, and merges the old and new data into a new block (block 608). The processing logic encrypts the entire new block (block 610) and sends the new block to the server computing system to be written, as well as a relinquish lease operation (block 612). The processing logic may determine if there is a conflict at block 614. If there is a conflict the processing logic returns to block 602, otherwise, the method 600 ends. In this embodiment, there is one old block and one new block. In other embodiments, multiple old blocks and multiple new blocks may be processed as well.

In one embodiment, the lease request may have the following format:
Data range being written (start, end offset)
Data needed at the start (byte count)
Data needed at the end (byte count).
The reply to the lease request may have the following format:
Lease ID
Old data from start (if any)
Old data from end (if any)
The lease relinquish request may have the following format:
Lease ID
New data at start (optional)
New data at end (optional)
Alternatively, the requests and replies may have other formats.

Figure 6B:
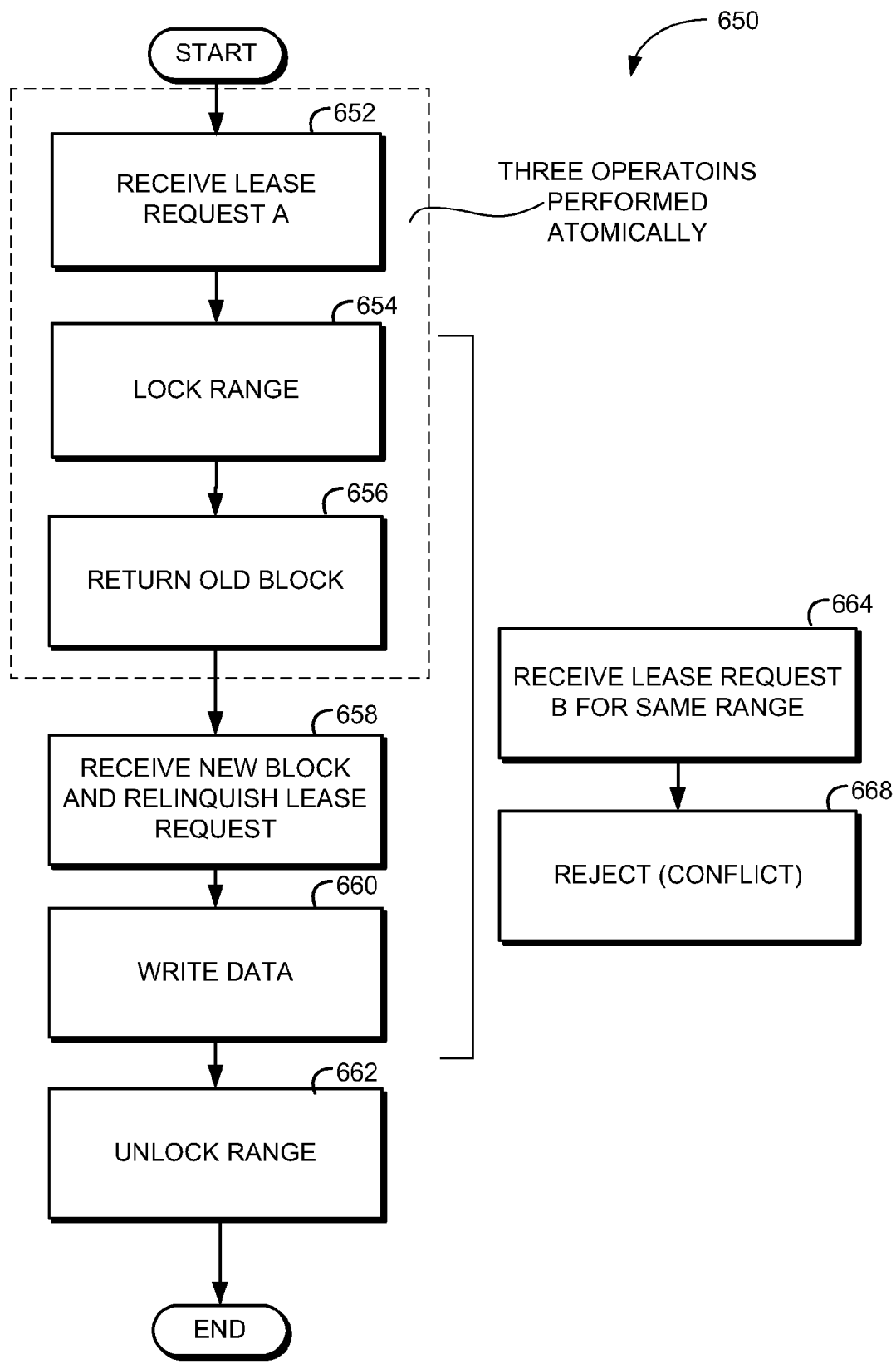
FIG. 6B is a flow diagram of one embodiment of a method of server-side operations for a read-modify-write sequence in a distributed environment.

FIG. 6B is a flow diagram of one embodiment of a method 650 of server-side operations for a read-modify-write sequence in a distributed environment. The method 650 is performed by processing logic that may comprise hardware (circuitry, dedicated logic, etc.), software (such as is run on a general purpose computing system or a dedicated machine), firmware (embedded software), or any combination thereof. In one embodiment, the file manager 114 of FIG. 1 performs the method 650. Alternatively, other components of the server computing system 104 can perform some or all of the operations of method 650.

Referring to FIG. 6B, processing logic begins with receiving a first lease request (lease request A) to obtain a lease of a data range of encrypted data (block 652). In response, the processing logic locks the data range (block 654) and returns the contents of the data range of encrypted data at the specified data range (block 656). The operations at blocks 652, 654, and 656 are performed by the processing logic atomically in response to a single network operation. For example, a client may initiate a single network request, and, in response, the processing logic performs the operations at blocks 654 and 656. Alternatively, additional operations may be performed in response to the single network operation.

Subsequently, the processing logic receives a new block of encrypted data that corresponds to the old block sent at block 656 (block 658). In one embodiment, the new block may have an lease identifier given to the old block. At block 658, the processing logic receives in the same network request a relinquish lease request. The processing logic in response writes the data into the data store (block 660), and unlocks the range (block 662), and the method 650 ends.

In one embodiment, anytime during when the data range is locked at block 654 and when the data range is unlocked at block 662, the processing logic may receive a second lease request (lease request B) for data in the same range, or portions of the same range (block 664). If so, the processing logic rejects the lease request as it is a conflict (block 686). It should be noted that the portions can be a subset or an overlapping range including supersets. The portions may also be overlapping at one end of the range but extending before or after the range as would be appreciated by one of ordinary skill in the art having the benefit of this disclosure. In some embodiments, the processing logic outright rejects the lease request. In another embodiment, the processing logic queues the second lease request until the first lease request is relinquished. Alternatively, the processing logic may perform other operations in response to conflicts as would be appreciated by one of ordinary skill in the art having the benefit of this disclosure.

Figure 7:
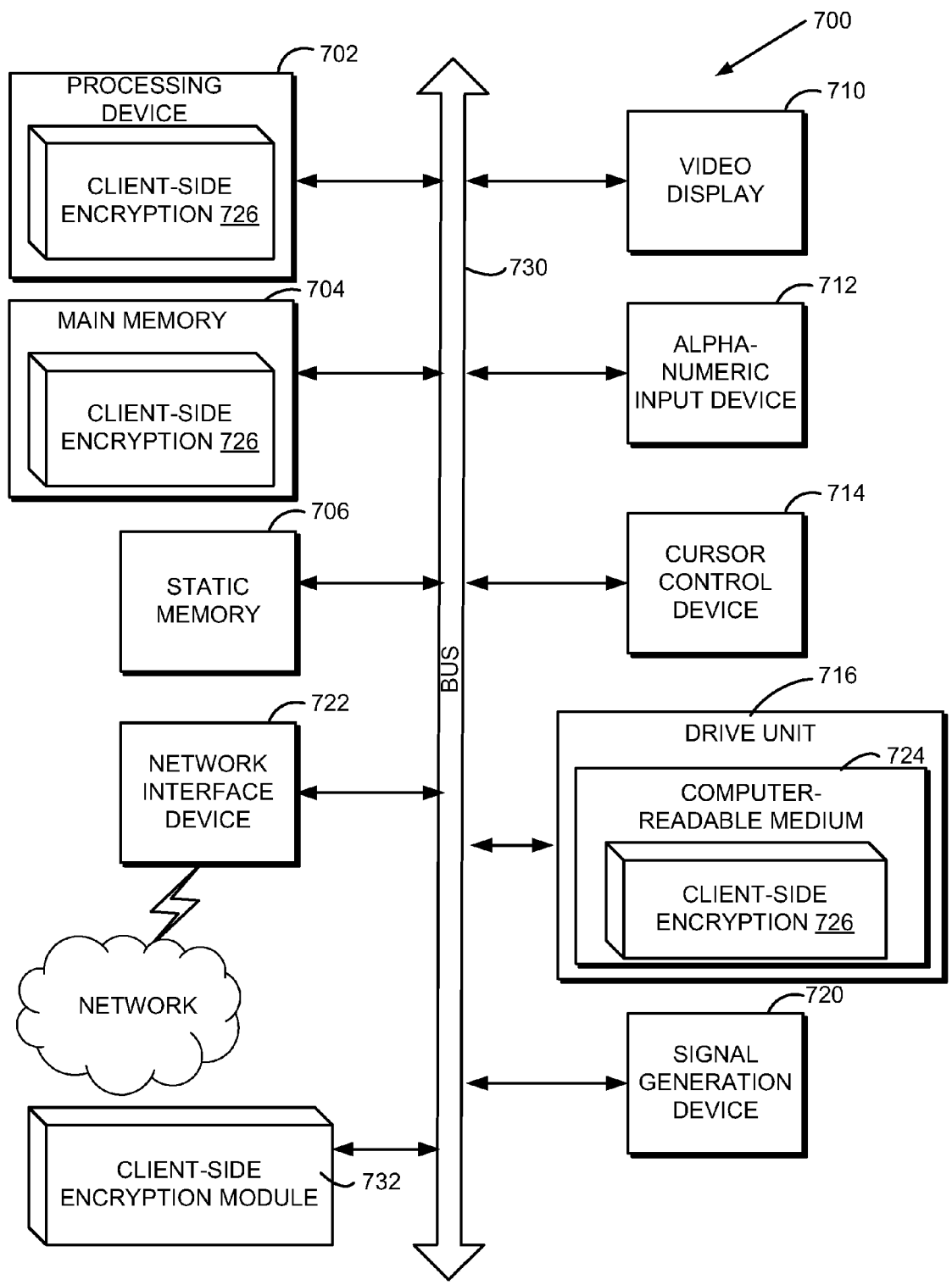
FIG. 7 illustrates a diagrammatic representation of a machine in the exemplary form of a computing system for client-side encryption.

FIG. 7 illustrates a diagrammatic representation of a machine in the exemplary form of a computing system 700 for client-side encryption. Within the computing system 700 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for client-side encryption in a distributed environment, such as the methods 500, 550, 600, and 650 described above. In one embodiment, the computing system 700 represents various components that may be implemented in the client computing system 108 as described above. Alternatively, the client computing system 108 may include more or less components as illustrated in the computing system 700. In another embodiment, the computing system 700 represents various components that may be implemented in the server computing system 104.

The exemplary computing system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 716, each of which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic (e.g., client-side encryption 726) for performing the operations and steps discussed herein.

The computing system 700 may further include a network interface device 722. The computing system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions (e.g., client-side encryption 726) embodying any one or more of the methodologies or functions described herein. The client-side encryption 726 may also reside, completely or at least partially, within the main memory 704 and/or within the processing device 702 during execution thereof by the computing system 700, the main memory 704 and the processing device 702 also constituting computer-readable storage media. The client-side encryption 726 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The client-side encryption module 732, components, and other features described herein (for example in relation to FIGS. 1-3B) can be implemented as discrete hardware components or integrated in the functionality of hardware components such as ASICS, FPGAs, DSPs, or similar devices. The client-side encryption module 732 may implement operations of client-side encryption as described herein with respect to FIGS. 4-6B. In addition, the client-side encryption module 732 can be implemented as firmware or functional circuitry within hardware devices. Further, the client-side encryption module 732 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   sending to a server computing system, by a processing device of a client computing system, a first network request to obtain a lease granting exclusive access to a data range of encrypted data for a fixed quantity of time and fetch contents of the data range as a first single atomic operation;

in response to the first network request, receiving by the processing device the contents of the data range of encrypted data;

sending to the server computing system, by the processing device, a second network request to write re-encrypted data; and sending to the server computing system after the second network request, by the processing device, a third network request to relinquish the lease and indicate an actual end of file for the data range when the data range includes the end of the file as a second single atomic operation.

2. The method of claim 1, further comprising:

decrypting the contents of the data range of encrypted data to obtain decrypted data;

modifying the decrypted data; and re-encrypting the modified data into the re-encrypted data.

3. The method of claim 2, wherein the encrypted data is one or more blocks of ciphertext, wherein the decrypted data is one or more blocks of plaintext, and wherein the re-encrypted data is one or more blocks of ciphertext.

4. The method of claim 1, wherein the encrypted data and re-encrypted data are encrypted using block-based encryption.

5. The method of claim 4, wherein said receiving the contents of the data range of encrypted data comprises receiving a current block of ciphertext comprising a first portion of ciphertext to be modified and a second portion of ciphertext not to be modified, and wherein the method further comprises:

decrypting the entire current block of ciphertext into plaintext;

modifying a first portion of the plaintext corresponding to the first portion of ciphertext to be modified;

merging the modified first portion and a second portion of the plaintext corresponding to the second portion of ciphertext not to be modified; and encrypting the first and second portions into a new block of ciphertext.

6. The method of claim 5, wherein said sending the second network request comprises sending the new block of ciphertext as the re-encrypted data.

7. The method of claim 4, wherein said receiving the contents of the data range of encrypted data comprises receiving a plurality of blocks of ciphertext to be modified, and wherein the method further comprises:

decrypting the plurality of blocks of ciphertext into a plurality of blocks of plaintext;

modifying one or more of the plurality of blocks of plaintext; and encrypting the modified one or more of the plurality of blocks of plaintext into new blocks of ciphertext.

8. The method of claim 7, wherein said sending the second network request comprises sending the new blocks of ciphertext as the re-encrypted data.

9. The method of claim 7, wherein said sending the second network request comprises sending all but a last one of the new blocks of ciphertext; and wherein said sending the third network request further comprises:

sending the last one of the new blocks of ciphertext;

writing the last one of the new blocks of ciphertext; and indicating an actual end of file within the last one of the new blocks of ciphertext, wherein indicating an actual end of file within the last one of the new blocks of ciphertext and relinquishing the lease are performed as a single atomic operation.

10. The method of claim 1, wherein the data range corresponds to encrypted data of an entire file.

11. The method of claim 1, wherein the data range corresponds to encrypted data of a portion of a file.

12. A method comprising:

in response to receiving from a client computing system a first network request, obtaining, by a processing device of a server computing system, a lease of a data range of encrypted data for a fixed quantity of time and fetching contents of the data range as a first single atomic operation;

sending to the client computing system the contents;

in response to receiving from the client computing system a second network request, writing, by the processing device re-encrypted data; and in response to receiving from the client computing system a third network request to relinquish the lease and send an indication of an actual end of file for the data range when the data range includes the end of the file, relinquishing, by the processing device, the lease and indicating an actual end of file when the data range includes the end of the file as a second single atomic operation.

13. The method of claim 12, wherein the second network request comprises a new block of ciphertext as the re-encrypted data.

14. The method of claim 12, wherein the second network request comprises all but a last one of a new set of blocks of ciphertext to be written as a first portion of the re-encrypted data, and wherein the third network request further comprises writing the last one of the new set of blocks of ciphertext and indicating an actual end of file within the last one of the new blocks of ciphertext, wherein indicating an actual end of file within the last one of the new blocks of ciphertext relinquishing the lease are performed as a single atomic operation.

15. A non-transitory computer readable storage medium including instructions that, when executed by a processing device of a client computing system, cause the client computing system to:

send to a server computing system over a network, by the processing device, a first network request to obtain a lease granting exclusive access to a data range of encrypted data for a fixed quantity of time and fetch contents of the data range as a first single atomic operation;

in response to the first network request, receive by the processing device the contents of the data range of encrypted data;

send to the server computing system, by the processing device, a second network request to write re-encrypted data; and send to the server computing system after the second network request, by the processing device, a third network request to relinquish the lease and indicate an actual end of file for the data range when the data range includes the end of the file as a second single atomic operation.

16. The non-transitory computer readable storage medium of claim 15, wherein the encrypted data and re-encrypted data are encrypted using block-based encryption, and wherein said receiving the contents of the data range of encrypted data comprises receiving a current block of ciphertext comprising a first portion of ciphertext to be modified and a second portion of ciphertext not to be modified, and wherein the processing device is further to:

decrypt the entire current block of ciphertext into plaintext;

modify a first portion of the plaintext corresponding to the first portion of ciphertext to be modified;

merge the modified first portion and a second portion of the plaintext corresponding to the second portion of ciphertext not to be modified; and encrypt the first and second portions into a new block of ciphertext.

17. The non-transitory computer readable storage medium of claim 15, wherein said receiving the contents of the data range of encrypted data comprises receiving a plurality of blocks of ciphertext to be modified, and wherein the processing device is further to:

decrypt the plurality of blocks of ciphertext into a plurality of blocks of plaintext;

modify one or more of the plurality of blocks of plaintext; and encrypt the modified one or more of the plurality of blocks of plaintext into new blocks of ciphertext.

18. The non-transitory computer readable storage medium of claim 17, wherein said sending the second network request comprises sending all but a last one of the new blocks of ciphertext, and wherein said sending the third network request comprises writing the last one of the new blocks of ciphertext and indicating an actual end of file within the last one of the new blocks of ciphertext, wherein indicating an actual end of file within the last one of the new blocks of ciphertext relinquishing the lease are performed as a single atomic operation.

19. A non-transitory computer readable storage medium including instructions that, when executed by a processing device of a server computing system, cause the processing device to:

in response to receiving from a client computing system a first network request, obtain, by the processing device, a lease of a data range of encrypted data for a fixed quantity of time and fetch contents of the data range as a first single atomic operation;

send to the client computing system, by the processing device, the contents;

in response to receiving from the client computing system a second network request, write, by the processing device, re-encrypted data; and in response to receiving from the client computing system a third network request to relinquish the lease and send an indication of an actual end of file for the data range when the data range includes the end of the file, relinquish, by the processing device, the lease and indicate an actual end of file for the data range when the data range includes the end of the file as a second single atomic operation.

20. A client computing system, comprising:

a network interface device; and a processing device, coupled to the network interface device, to:

send to a server computing system, via the network interface device, a first network request to obtain a lease granting exclusive access to a data range of encrypted data for a fixed quantity of time and fetch contents of the data range as a first single atomic-operation;

in response to the first network request, receive, via the network interface device, the contents of the data range;

send to the server computing system, via the network interface device, a second network request to write re-encrypted data; and send to the server computing system after the second network request, via the network interface device, a third network request to relinquish the lease of the data range and indicate an actual end of file for the data range when the data range includes the end of the file as a second single atomic operation.

* * * * *